US010875956B2

(12) United States Patent
Chen et al.

(10) Patent No.: US 10,875,956 B2
(45) Date of Patent: Dec. 29, 2020

(54) ISOCYANATE PREPOLYMER COMPOSITION AND CROSSLINKED POLYURETHANE PREPARED THEREFROM

(71) Applicant: BASF SE, Ludwigshafen (DE)

(72) Inventors: Bin-Erik Chen, Shanghai (CN); Wei Zhuang, Singapore (SG); DeHui Yin, Shanghai Pu Dong (CN); Etsuhiro Yamamoto, Yatomi (JP); Yasuyuki Suzuki, Kuwana (JP)

(73) Assignee: BASF SE, Ludwigshafen (DE)

( * ) Notice: Subject to any disclaimer, the term of this patent is extended or adjusted under 35 U.S.C. 154(b) by 1130 days.

(21) Appl. No.: 14/905,697

(22) PCT Filed: Jul. 15, 2014

(86) PCT No.: PCT/EP2014/065147
§ 371 (c)(1),
(2) Date: Jan. 15, 2016

(87) PCT Pub. No.: WO2015/007731
PCT Pub. Date: Jan. 22, 2015

(65) Prior Publication Data
US 2016/0145376 A1 May 26, 2016

(30) Foreign Application Priority Data

Jul. 16, 2013 (WO) ............... PCT/CN2013/000853

(51) Int. Cl.
| C08G 18/76 | (2006.01) |
| C08G 18/10 | (2006.01) |
| C08G 18/42 | (2006.01) |
| D01F 6/70 | (2006.01) |
| C08G 18/12 | (2006.01) |
| C08L 75/04 | (2006.01) |
| C08G 18/65 | (2006.01) |
| C08G 18/48 | (2006.01) |
| C08G 18/40 | (2006.01) |
| C08L 75/08 | (2006.01) |
| D01D 5/084 | (2006.01) |
| D01F 6/94 | (2006.01) |

(52) U.S. Cl.
CPC ......... *C08G 18/7664* (2013.01); *C08G 18/10* (2013.01); *C08G 18/12* (2013.01); *C08G 18/4018* (2013.01); *C08G 18/4238* (2013.01); *C08G 18/4241* (2013.01); *C08G 18/4854* (2013.01); *C08G 18/6588* (2013.01); *C08G 18/7657* (2013.01); *C08L 75/04* (2013.01); *C08L 75/08* (2013.01); *D01D 5/084* (2013.01); *D01F 6/70* (2013.01); *D01F 6/94* (2013.01); *D10B 2331/10* (2013.01)

(58) Field of Classification Search
CPC .... C08G 18/7664; C08G 18/10; C08G 18/12; C08G 18/4241; C08G 18/4854; C08G 18/6588; C08G 18/7657; D01F 6/70
See application file for complete search history.

(56) References Cited

U.S. PATENT DOCUMENTS

| 4,261,946 A | 4/1981 | Goyert et al. |
| 4,347,338 A | 8/1982 | Torii et al. |
| 6,142,189 A | 11/2000 | Bhattacharyya |
| 7,615,167 B2 * | 11/2009 | Zhou ............... B32B 17/10293 252/511 |
| 2010/0105842 A1 * | 4/2010 | Hilmer ............... C08G 18/0895 525/452 |
| 2011/0118431 A1 | 5/2011 | Doyle et al. |

FOREIGN PATENT DOCUMENTS

| CN | 100390216 C | 5/2008 | |
| CN | 101205289 A | 6/2008 | |
| CN | 104379672 A | 2/2015 | |
| CN | 104797749 A | 7/2015 | |
| DE | 41 15 508 A1 | 11/1992 | |
| DE | 44 12 329 A1 | 10/1995 | |
| EP | 0 922 719 A1 | 6/1999 | |
| EP | 1 078 944 A1 | 2/2001 | |
| EP | 1 158 011 A1 | 11/2001 | |
| EP | 1 692 203 | 8/2006 | |
| EP | 2 424 912 | 3/2012 | |
| GB | 2 347 933 A | 9/2000 | |
| JP | S-59091118 * | 5/1984 | ............ C08G 63/12 |
| JP | 60-161416 A | 8/1985 | |
| JP | 62-275117 A | 11/1987 | |
| JP | 2-127515 A | 5/1990 | |
| JP | 0726082 B2 * | 7/1991 | ............ C08G 18/12 |
| JP | 3-285906 A | 12/1991 | |
| JP | 9-202819 A | 8/1997 | |
| JP | 10-501572 A | 2/1998 | |
| JP | 2001329039 A * | 11/2001 | |
| WO | WO 2005/053938 A1 | 6/2005 | |
| WO | WO 2005/054322 A2 | 6/2005 | |
| WO | WO 2008/116801 A1 | 10/2008 | |
| WO | WO 2010/125009 A1 | 11/2010 | |

OTHER PUBLICATIONS

English Translation of JPS-59091118_05-1984.*
JP-0726082 (B2), Jul. 1991, English Translation.*
CAS No. 9016-87-9. Nov. 8, 1984.*
JP-2001329039_11-2001_English Translation.*
U.S. Appl. No. 13/857,524, filed Apr. 5, 2013, US 2013/0267639 A1, Zhuang, et al.
U.S. Appl. No. 14/895,858, filed Dec. 3, 2015, Yin, et al.
International Search Report dated Oct. 31, 2014 in PCT/EP2014/065147.
International Preliminary Report on Patentability dated Aug. 11, 2015 in PCT/EP2014/065147.

* cited by examiner

*Primary Examiner* — Michael L Leonard
(74) *Attorney, Agent, or Firm* — Oblon, McClelland, Maier & Neustadt, L.L.P.

(57) ABSTRACT

An isocyanate prepolymer composition and a crosslinked thermoplastic polyurethane composition are disclosed, preferably in the form of a fiber. Also disclosed is the process for preparing said prepolymer composition and crosslinked thermoplastic polyurethane. Both of the isocyanate prepolymer composition and crosslinked thermoplastic polyurethane show improved properties.

9 Claims, No Drawings

ISOCYANATE PREPOLYMER COMPOSITION AND CROSSLINKED POLYURETHANE PREPARED THEREFROM

TECHNOLOGY FIELD

The invention relates to an isocyanate prepolymer composition and crosslinked thermoplastic polyurethane composition prepared therefrom, especially in the form of melt-spun elastic fiber, and to processes for preparing said isocyanate prepolymer composition and crosslinked polyurethane composition.

BACKGROUND ART

Thermoplastic polyurethanes (TPU) find many industrial applications because of its good mechanical properties and inexpensive processing. By modifying the compositions of TPU, a wide variety of properties can be achieved. To improve the property profile of TPU, it is known that cross linker can be introduced into the TPU so as to lead to an increase in strength.

WO 2008/116801 A1 discloses a method for the reaction of thermoplastic polyurethane with compounds having isocyanate groups. EP 1 078 944 is directed to the synthesis of thermoplastic polyurethanes by further using isocyanates with three reactive isocyanate groups having an urethone-imine structure. WO 2005/054 322 discloses a method for reacting thermoplastic polyurethane with isocyanate containing three isocyanate groups. The reaction of a thermoplastic polyurethane, preferably in the molten state, with compounds having isocyanate groups is referred to as prepolymer crosslinking and is also known in general terms from U.S. Pat. Nos. 4,261,946, 4,347,338, DE 41 15 508 A1, DE 44 12 329A1, EP 922 719A1, GB 2347933, U.S. Pat. No. 6,142,189, EP 1 158 011 A1, EP 1 692 203 A1 and WO 2005/053 938.

The existing crosslinked TPU generally comprises the reaction product of a thermoplastic polyurethane, an isocyanate prepolymer which can be prepared from the reaction of diisocyanate and polyol. CN 101205289A disclosed a method to make isocyanate prepolymer with an average isocyanate functionality (Fn)>2 by adding tri-ol or tetra-ol such as glycerol. It should be noted that such processes would produce high viscosity isocyanate prepolymers, which have been found detrimental to the properties such as processability and applicability of said prepolymer and crosslinked TPU prepared therefrom. EP 0 922 719 A1 disclosed an isocyanate prepolymer with functionality=2, and by using this isocyanate prepolymer, the crosslinked TPU showed higher HDT temperature.

CONTENTS OF THE INVENTION

It was then an object of the present invention to develop a functionality >2 prepolymer composition with improved properties, especially reduced viscosity. Thus, the invention provides an isocyanate prepolymer composition comprising:
an isocyanate prepolymer;
polymethylene polyphenyl polyisocyanate (PMDI) with chemical structure shown below, more preferably PMDI is a mixture of compounds having a formula as shown below, also referred to as PMDI or PMDI mixture

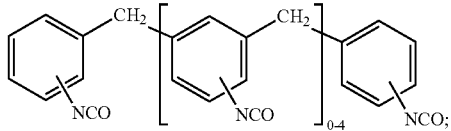

and optionally,
a plasticizer.

The invention further provides a process for preparing an isocyanate prepolymer composition comprising mixing the following components:
an isocyanate prepolymer;
PMDI with chemical structure shown below, more preferably PMDI is a mixture of compounds having a formula as shown below

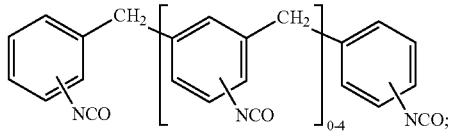

and optionally,
a plasticizer.

In a preferred embodiment, if the plasticizer is present in said composition, the isocyanate prepolymer is first mixed with the plasticizer, and then the resulting mixture is mixed with PMDI, more preferably with the PMDI mixture as indicated above.

It was another object of the present invention to provide a crosslinked thermoplastic polyurethane composition, with improved properties, especially high temperature resistance. The invention provides a crosslinked thermoplastic polyurethane composition comprising the reaction product of the following components:
a thermoplastic polyurethane;
the isocyanate prepolymer composition according to the invention; and optionally,
a supplementary substance.

In a preferred embodiment, the crosslinked thermoplastic polyurethane composition is in the form of melt-spun elastic fiber.

In addition, the invention provides a process for preparing a crosslinked thermoplastic polyurethane composition, comprising reacting the following components:
a thermoplastic polyurethane;
the isocyanate prepolymer composition according to the invention; and optionally,
a supplementary substance.

The invention further provides a use of PMDI and/or a plasticizer in preparing isocyanate prepolymer composition or crosslinked thermoplastic polyurethane composition.

In the present invention, most preferably, the isocyanate prepolymer is the reaction product between diphenylmethane 4,4'-diisocyanate, and/or diphenylmethane 2,2'-diisocyanate, and/or diphenylmethane 2,4'-diisocyanate (MDI) and a polyester polyol based on adipic acid, 2-methyl-1,3-propanediol and trimethylolpropane.

According to the invention, the isocyanate prepolymer composition shows a substantially reduced viscosity. The crosslinked thermoplastic polyurethane composition also shows improved high temperature resistance. The product has the usual high strengths of TPU combined with a lower tension set and a higher use temperature, which is important for elastic fibers.

MODE OF CARRYING OUT THE INVENTION

For the purpose of the invention, unless otherwise indicated, all operations and measurements are conducted at room temperature and at the atmospheric pressure.

For the purpose of the invention, "isocyanate prepolymer composition" refers to a mixture or blend of an isocyanate prepolymer, PMDI and optionally a plasticizer.

For the purpose of the invention, "crosslinked thermoplastic polyurethane composition" refers to a product prepared by reacting a thermoplastic polyurethane and the isocyanate prepolymer composition according to the invention, irrespective of the thermoplastic or thermosetting nature of the resulting product.

For the purpose of the invention, unless indicated otherwise, molecular weight of a polymer material refers to number average molecular weight, measured by means of gel permeation chromatography (GPC) in accordance with DIN 55672-1:2007, with tetrahydrofuran as eluent and PMMA as calibration standard.

The isocyanate prepolymer composition of the present invention comprises:
an isocyanate prepolymer;
PMDI with chemical structure as shown below, more preferably PMDI is a mixture of compounds having a formula as shown below

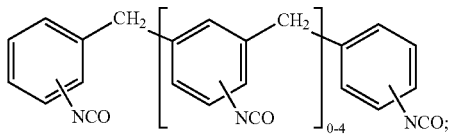

and optionally,
an plasticizer.

In preferred embodiments, the weight ratio of the isocyanate prepolymer to the plasticizer may range from about 1:0.2 to 1:0.05, the weight ratio of the isocyanate prepolymer to PMDI may range from about 1:0.1 to about 1:5, preferably from about 1:0.2 to about 1:3, more preferably from about 1:0.3 to about 1:2, more preferably about from 1:0.3 to about 1:1.5, and most preferably from about 1:0.33 to 1:1.

The crosslinked thermoplastic polyurethane composition of the present invention comprises the reaction product of the following components:
a thermoplastic polyurethane;
the isocyanate prepolymer composition according to the invention; and optionally,
a supplementary substance.

In a specific embodiment, the crosslinked thermoplastic polyurethane composition of the present invention comprises the reaction product of the following components:
a thermoplastic polyurethane;
the isocyanate prepolymer composition according to the invention; and
a supplementary substance.

In a specific embodiment, the crosslinked thermoplastic polyurethane composition of the present invention essentially consists of the reaction product of the following components:

a thermoplastic polyurethane;
the isocyanate prepolymer composition according to the invention; and optionally,
a supplementary substance.

In the context of this embodiment "essentially consist of" has the meaning that more than 50 weight-% of the thermoplastic polyurethane composition derive from said components, more preferably more than 75 weight %, more preferably more than 90 weight % and most preferably more than 97 weight-%.

In a further specific embodiment, the crosslinked thermoplastic polyurethane composition of the present invention consists of the reaction product of the following components:
a thermoplastic polyurethane;
the isocyanate prepolymer composition according to the invention; and optionally,
a supplementary substance.

In a preferred embodiment, the crosslinked thermoplastic polyurethane composition is in the form of melt-spun elastic fiber. The cross section of the fiber is in preferred embodiments round, elliptic, triangle, square, or Y shape depends on the design of spinneret. In other preferred embodiments the fiber is multi-filament. The line density of the fiber is in between 15 denier to 1000 denier, preferred 15 denier to 70 denier, most preferred 20 denier to 40 denier. Denier is a unit to describe the line density of the fiber, 20 denier means the 9,000 m long fiber has 20 g weight.

In addition, the invention provides a process for preparing a crosslinked thermoplastic polyurethane composition, comprising reacting the following components:
a thermoplastic polyurethane;
the isocyanate prepolymer composition according to the invention; and optionally,
a supplementary substance.

In a specific embodiment, the process for preparing a crosslinked thermoplastic polyurethane composition of the invention comprises reacting the following components:
a thermoplastic polyurethane;
the isocyanate prepolymer composition according to the invention; and
a supplementary substance.

In preferred embodiments, the weight ratio of the isocyanate prepolymer composition to the thermoplastic polyurethane composition ranges from about 1:0.01 to 1:0.5, preferably from about 1:0.02 to 1:0.4, more preferably from about 1:0.04 to 1:0.2, and most preferably from about 1:0.05 to 1:0.15.

In a preferred embodiment, if the plasticizer is present in said composition, the isocyanate prepolymer is first mixed with the plasticizer, which is referred to as resulting mixture or mixture 1, and then, in a second step the resulting mixture (mixture 1) is mixed with PMDI, respectively the PMDI mixture, which results in a mixture 2 and in a third step then the thermoplastic polyurethane is added to mixture 2 and mixed resulting in a mixture 3. In an even more preferred embodiment, the plasticizer is mixed with the starting materials of the isocyanate prepolymer.

In the present invention, most preferably, the isocyanate prepolymer is the reaction product between diphenylmethane 4,4'-diisocyanate, and/or diphenylmethane 2,2'-diisocyanate, and/or diphenylmethane 2,4'-diisocyanate (MDI) and a polyester polyol based on adipic acid, 2-methyl-1,3-propanediol and trimethylolpropane.

The above components and the processing will be described in the following:

One preferred embodiment (1) of this invention is an isocyanate prepolymer composition comprising:
an isocyanate prepolymer;
polymethylene polyphenyl polyisocyanate (PMDI) with chemical structure shown below, more preferably PMDI is a mixture of compounds having a formula as shown below:

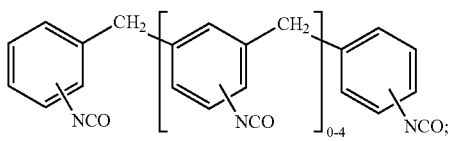

and optionally, a plasticizer.

Another preferred embodiment (2) of this invention is the isocyanate prepolymer composition according to embodiment (1), wherein the isocyanate prepolymer is the reaction product of (a) isocyanates with (b) compounds which are reactive toward isocyanates and have a number average molecular weight in the range from 0.5 kg/mol to 10 kg/mol.

Another preferred embodiment (3) is the isocyanate prepolymer composition according to embodiment (1) or (2), wherein the isocyanate prepolymer is the reaction product of diphenylmethane 4,4'-diisocyanate, and/or diphenylmethane 2,2'-diisocyanate, and/or diphenylmethane 2,4'-diisocyanate (MDI) with a polyester polyol based on adipic acid, 2-methyl-1,3-propanediol and/or trimethylolpropane, the mole ratio of said polyester polyol to said diisocyanates is between 1:1 to 1:3, preferably between 1:1.5 to 1:2.5, more preferably 1:2.

Another preferred embodiment (4) is the isocyanate prepolymer composition according to embodiments (1), (2) or (3), wherein the isocyanate prepolymer is the reaction product between diphenylmethane 4,4'-diisocyanate, and a polyester polyol based on adipic acid, 2-methyl-1,3-propanediol and trimethylolpropane, wherein the ratio of 2-methyl-1,3-propanediol and trimethylolpropane should make the polyester polyol have an average functionality >2, preferably between 2.1 and 3, more preferably between 2.1 and 2.7, more preferably between 2.2 and 2.5 and most preferably between 2.3 and 2.5.

Another preferred embodiment (5) is the isocyanate prepolymer composition according to any of the embodiments (1), (2), (3) or (4), wherein PMDI, more preferably the PMDI mixture, has an average functionality of 2 to 6, preferably 2 to 4, more preferably 2.5 to 3.

Another preferred embodiment (6) is the isocyanate prepolymer composition according to any of the embodiments (1), (2), (3), (4) or (5), wherein PMDI, preferably the PMDI mixture, is selected from Lupranate® M20S, M20R and the mixture thereof.

Another preferred embodiment (7) is the isocyanate prepolymer composition according to any of embodiments (1), (2), (3), (4), (5) or (6), wherein said prepolymer has an average isocyanate functionality of more than 2, preferably between 2.1 and 3, more preferably between 2.1 and 2.7, preferably between 2.2 and 2.7 and most preferably between 2.3 and 2.5.

A preferred process (1) for preparing the isocyanate prepolymer composition according to any of the embodiments (1), (2), (3), (4), (5), (6) or (7), comprises mixing the isocyanate prepolymer, PMDI, preferably the PMDI mixture, and optionally, the plasticizer.

Another preferred process (2) for preparing the isocyanate prepolymer composition is the process (1), wherein the PMDI, preferably the PMDI mixture, and/or plasticizer is mixed with the starting materials of the isocyanate prepolymer, or if the plasticizer is present in said composition, the isocyanate prepolymer is first mixed with the plasticizer, and then with PMDI preferably the PPMDI mixture.

Another preferred embodiment (10) of the invention is a crosslinked thermoplastic polyurethane composition, essentially comprising the reaction product of the following components:
a thermoplastic polyurethane;
the isocyanate prepolymer composition according to any of claims 1 to 7; and optionally,
a supplementary substance.

Another preferred embodiment (11) is a crosslinked thermoplastic polyurethane composition according to embodiment (10), being in the form of a fiber, more preferably this fiber is melts spun, and even more preferably it is also elastic, in other words a melt-spun elastic fiber.

A preferred process (12) for preparing the crosslinked thermoplastic polyurethane composition according to embodiment (10) or (11), comprising reacting the following components:
a thermoplastic polyurethane;
the isocyanate prepolymer composition according to any of claims 1 to 7; and optionally,
a supplementary substance.

Another preferred process (13) for preparing a crosslinked thermoplastic polyurethane composition according to embodiment (10) or (11) is the process (12), wherein the PMDI, and/or plasticizer is added to the thermoplastic polyurethane, the isocyanate prepolymer and/or a mixture of the isocyanate prepolymer and the thermoplastic polyurethane.

Another preferred process (14) for preparing a crosslinked thermoplastic polyurethane composition according to embodiment (10) or (11) is the process (12) or (13), wherein the PMDI and/or plasticizer is mixed with the starting materials of the isocyanate prepolymer, or if the plasticizer is present in said composition, the isocyanate prepolymer is first mixed with the plasticizer, and then with PMDI. Starting materials is used to define all materials which are used to produce the prepolymer.

Another preferred process (15) for preparing a crosslinked thermoplastic polyurethane according to embodiment (10) or (11), includes the following steps:
(1) melting a thermoplastic polyurethane in a extruder at a temperature of 180° C. to 220° C.;
(2) to the molten thermoplastic polyurethane, adding the isocyanate prepolymer composition according to any of the embodiments (1) to (7) and mixing the resulting mixture to form a melt; and
(3) extruding the melt through a spinneret heated at 190° C. to 230° C. to obtain a melt-spun elastic fiber.

Another preferred process (16) for preparing a crosslinked thermoplastic polyurethane composition according to embodiments (10) or (11) is the process (15), further including the following subsequent steps:
(4) spraying finish oil on the fiber, and the finish, preferably the oil is mineral oil and/or silicone oil;
(5) winding up the fiber through a roller at a line speed m/min of 100 to 1000 m/min; and
(6) storing the fibers for at least 15 h at 80° C.

Another part of the invention is the use of PMDI as defined in this description and/or a plasticizer as defined in this description in preparing isocyanate prepolymer composition as defined in this description or crosslinked thermoplastic polyurethane composition as defined in this description.

Thermoplastic Polyurethane Composition

In the present invention, thermoplastic polyurethane comprises the following components:
(a) one or more organic diisocyanates,
(b) one or more compounds reactive toward isocyanate,
(c) one or more chain extenders, preferably having a molecular weight of from 60 g/mol to 499 g/mol, and
(d) optionally at least one catalyst, and/or
(e) optionally at least one auxiliary, and/or
(f) optionally at least one additive.

The thermoplastic polyurethane composition has a number average molecular weight between $8*10^4$ g/mol to $1.8*10^5$ g/mol, more preferably $1.0*10^5$ g/mol to $1.5*10^5$ g/mol.

The components (a), (b), (c) and optional components (d), (e) and (1) used in the invention are described by way of examples in the following.

Isocyanate

Suitable and preferred organic diisocyanates (a) are customary aliphatic, cycloaliphatic, araliphatic and/or aromatic isocyanates. Preferred examples thereof include but are not limited to trimethylene diisocyanate, tetramethylene diisocyanate, pentamethylene diisocyanate, hexamethylene diisocyanate, heptamethylene diisocyanate and/or octamethylene diisocyanate, 2-methylpentamethylene 1,5-diisocyanate, butylenes 1,4-diisocyanate, 2-ethylbutylene 1,4-diisocyanate, pentamethylene 1,5-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, dicyclohexylmethane 4,4'-, 2,4'- and/or 2,2'-diisocyanate (MDI), diphenylmethane 2,2'-, 2,4'- and/or 4,4'-diisocyanate (MDI), naphthylene 1,5-diisocyanate (NDI), tolylene 2,4- and/or 2,6-diisocyanate (TDI), diphenylmethane diisocyanate, 3,3'-dimethyldiphenyl diisocyanate, 1,2-diphenylethane diisocyanate, phenylene diisocyanate, and any combination thereof. Diisocyanate is either a single disocyanate or a mixture of disocyanates.

Diphenylmethane 2,2'-, 2,4'- and/or 4,4'-diisocyanate (MDI), and dicyclohexylmethane 4,4'-, 2,4'- and/or 2,2'-diisocyanate (H12MDI) are each preferred embodiments. Diphenylmethane 2,2'-, 2,4'- and/or 4,4'-diisocyanate are particularly preferred.

In a particularly preferred embodiment, the organic diisocyanate (a) is an isocyanate mixture comprising at least 90% by weight, more preferably at least 95% by weight, further preferably at least 98% by weight 4,4'-diphenylmethane diisocyanates (4,4'-MDI), and the remaining is other diisocyanates, preferably 2,2'- and or 2,4'-Diphenylmethanediisocynate.

Polyol

The compounds (b) which are reactive toward isocyanate are preferably polyhydric alcohols, polyesterols (i.e. polyester polyols), polyetherols (i.e. polyether polyols), and/or polycarbonate diols, for which the collective term "polyols" is also usually used. The number average molecular weights (Mn) of these polyols are from 0.5 kg/mol to 8 kg/mol, preferably from 0.6 kg/mol to 5 kg/mol, very preferably from 0.8 kg/mol to 3 kg/mol, in particular 1 kg/mol to 2 kg/mol.

These polyols in addition preferably have only primary hydroxy groups. The polyols are particularly preferably linear hydroxyl-terminated polyols. Owing to the method of production, these polyols often comprise small amounts of nonlinear compounds. They are therefore frequently also referred to as "essentially linear polyols".

Polyol is either a single polyol or a mixture of polyols. In another preferred embodiment, the polyol is a mixture of two or more polyols. In one preferred embodiment, it is a mixture of polyester polyols and other polyols such as polyester polyols, polyether polyols and/or polycarbonate diols as compounds (b). Polyester polyols, and a mixture of one or more polyether polyols are more preferred.

In case of a mixture of polyols, at least one polyester polyol is used in amount of more than 40% by weight, preferably more than 60% by weight, more preferably more than 80% by weight, and most preferably more than 90% by weight, based on the total weight of the mixture.

Polyether diols, polyester diols and polycarbonate diols in the invention are those known commonly used in preparation of TPU.

The polyester diols can be based on dicarboxylic acids having from 2 to 12 carbon atoms, preferably from 4 to 8 carbon atoms, which are generally known for the preparation of polyester diols and polyhydric alcohols.

Preferred examples of polyhydric alcohols are alkanediols having from 2 to 10, preferably from 2 to 6, carbon atoms, e.g. ethanediol, 1,3-propanediol, 1,4-butanediol, 1,5-pentanediol, 1,6-hexanediol, 1,10-decanediol, 2,2-dimethyl-1,3-propanediol, 2-methyl-1,3-propanediol, 1,2-propanediol, 3-methyl-1,5-pentanediol, and dialkylene ether glycols such as diethylene glycol and dipropylene glycol. Another examples of polyhydric alcohols are 2,2-Bis(hydroxymethyl)1,3-propanediol and trimethylolpropane. Depending on the desired properties, the polyhydric alcohols can be used either alone or, if appropriate, in mixtures with one another. To keep the glass transition temperature Tg of the polyol very low, it can be advantageous to use a polyester diol based on branched diols, particularly preferably based on 3-methyl-1,5-pentanediol and 2-methyl-1,3-propandiol. The polyester diol is particularly preferably based on at least two different diols, i.e. polyester diols which are prepared by condensation of dicarboxylic acids with a mixture of at least two different diols. In case of a mixture of diols of which at least one is a branched diol, e.g. 2-methyl-1,3-propane diol, the amount of branched diols is more than 40% by weight, preferably more than 70% by weight, more preferably more than 90% by weight, based on the total weight of the diols mixture.

Preferred dicarboxylic acids are, for example: aliphatic dicarboxylic acids, such as succinic acid, glutaric acid, suberic acid, azelaic acid, sebacic acid and preferably adipic acid and aromatic dicarboxylic acids such as phthalic acid, isophthalic acid and terephthalic acid. The dicarboxylic acids can be used individually or as mixtures, e.g. in the form of a mixture of succinic acid, glutaric acid and adipic acid. Mixtures of aromatic and aliphatic dicarboxylic acids can likewise be used. To prepare the polyesterols, it may be advantageous to use the corresponding dicarboxylic acid derivatives such as dicarboxylic esters having from 1 to 4 carbon atoms in the alcohol radical, dicarboxylic anhydrides or dicarboxylic acid chlorides in place of the dicarboxylic acids. The polyester diol is particularly preferably based on adipic acid. In yet another embodiment polyester polyols based on ε-caprolactone is preferred.

Preferred polyester polyolshave a number average molecular weight (Mn) ranging from 0.5 to 3 kg/mol, preferably 0.8 kg/mol to 2.5 kg/mol, more preferably from 1 kg/mol to 2 kg/mol, and in particular 1 kg/mol.

Suitable polyether polyols can be prepared by reacting one or more alkylene oxides having from 2 to 4 carbon atoms in the alkylene radical with a starting material molecule containing two active hydrogen atoms. Typical alkylene oxides are ethylene oxide, 1,2-propylene oxide, epichlorohydrin, and 1,2- and 2,3-butylene oxide. Ethylene oxide and mixtures of 1,2-propylene oxide and ethylene oxide are preferably utilized. The alkylene oxides can be used individually, alternately in succession or as mixtures. The typical starting material molecules are, for example water, amino alcohols such as N-alkyldiethanolamines, and diols, preferably such as ethyleneglycol, 1,3-propyleneglycol, 1,4-butanediol and 1,6-hexanediol. It is also possible to use mixtures of starting material molecules. Preferred polyether polyols include hydroxyl group-containing polymerization products of tetrahydrofuran.

Preferably used are hydroxyl group-containing polytetrahydrofuran, and co-polyether polyols of 1,2-propylene oxide and ethylene oxide in which more than 50 percent of the hydroxyl groups are primary hydroxyl groups, preferably from 60 to 80 percent, and in which at least part of the ethylene oxide is a block in terminal position.

Most preferred polyether polyol is hydroxyl group-containing polytetrahydrofuran having a number average molecular weight in the range from 0.6 kg/mol to 3 kg/mol, preferably from 0.8 kg/mol to 2.5 kg/mol, more preferably from 1 kg/mol to 2 kg/mol.

Preferred said polyol is a mixture of at least one polyester polyol and at least one polyether polyol.

Examples of polyether polyols include but are not limited to those based on generally known starting materials and customary alkylene oxides.

The polyols according to the invention can either react with isocyanates to produce isocyanate prepolymer or react with isocyanate prepolymers to produce TPU.

Preferred polyols used for reacting with isocyanates to produce isocyanate prepolymer have an average functionality greater than 2, preferably between 2.1 and 3, more preferably between 2.1 and 2.7, and most preferably between 2.2 and 2.5. Furthermore, suitable polyols used for reacting with isocyanate prepolymers to produce TPU preferably have an average functionality of from 1.8 to 2.3, preferably from 1.9 to 2.2, in particular 2. The term "functionality" means the number of groups which react with isocyanate under condition of polymerization.

Chain Extender

As chain extenders (c), it is possible to use generally known aliphatic, araliphatic, aromatic and/or cycloaliphatic compounds having a molecular weight of from 60 g/mol to 499 g/mol, preferably from 60 g/mol to 400 g/mol, more preferably bifunctional compounds, for example diamines and/or alkane diols having from 2 to 10 carbon atoms in the alkylene radical, in particular 1,2-ethylene diol, 1,4-butanediol, 1,6-hexanediol, 1,3-propanediol, and/or dialkylene-, trialkylene-, tetraalkylene-, pentaalkylene-, hexaalkylene-, heptaalkylene-, octaalkylene-, nonaalkylene- and/or decaalkylene-glycols having from 2 to 8 carbon atoms in alkylene moiety, preferably corresponding oligopropyleneglycols and/or polypropyleneglycols. In preferred embodiments mixtures of the chain extenders are used. Preference is given to 1,4-butanediol, 1,2-ethylenediol, 1,6-hexanediol or combination thereof as chain extender.

In a preferred embodiment, chain extender (c) is used in an amount of from 2% to 20% by weight, preferably from 5% to 15% by weight, based on the total weight of components (a), (b) and (c).

Chain extender is either a single chain extender or a mixture of chain extenders.

Catalyst

Suitable catalysts (d), which, in particular, accelerate the reaction between NCO groups of the organic diisocyanates (a) and the polyols (b) and component (c) are tertiary amines which are known and customary in the prior art, for example, triethylamine, dimethylcyclohexylamine, N-methylmorpholine, 2-(dimethylaminoethoxy)ethanol, N,N'-dimethylpiperazine, diazabicyclo[2.2.2]octane and the like, and also, in particular, organic metal compounds such as titanic esters, bismuth carboxylic esters, zinc esters, iron compounds such as iron (III) acetylacetonate, tin compounds, e.g. tin diacetate, tin dioctoate, tin dilaurate or dialkyl tin salts of aliphatic carboxylic acids, e.g. dibutyltin diacetate, dibutyltin dilaurate or the like. In bismuth salts oxidation state of the bismuth is preferably 2 or 3, more preferably 3.

Preferred carboxylic acids of bismuth carboxylic esters have 6 to 14 carbon atoms, more preferred 8 to 12 carbon atoms. Preferred examples of bismuth salts are bismuth(III)-neodecanoate, bismuth-2-ethylhexanoate and bismuth-octanoate.

The catalysts, if used, are usually used in amounts of from 0.0001 to 0.1 parts by weight per 100 parts by weight of polyols (b). Preference is given to tin catalysts, in particular tin dioctoate.

Apart from catalysts (d), customary auxiliaries (e) and/or additives (f) can be added, if desired, in addition to components (a) to (c).

As auxiliaries (e), mention may be made by way of preferred example of surface-active substances, flame retardants, nucleating agents, lubricant wax, dyes, pigments, and stabilizers, e.g. against oxidation, hydrolysis, light, heat or discoloration, and as additives (f), mention may be made by way of preferred example of inorganic and/or organic fillers and reinforcing materials. As hydrolysis inhibitors, preference is given to oligomeric and/or polymeric aliphatic or aromatic carbodiimides. To stabilize TPU of the invention against aging, stabilizers are added to TPU in preferred embodiments. For the purposes of the present invention, stabilizers are additives which protect a plastic or a plastic mixture against damaging environmental influences.

Catalyst is either a single catalyst or a mixture of catalysts.

If the TPU of the invention is exposed to thermooxidative damage during use, in preferred embodiments antioxidants are added. Preference is given to phenolic antioxidants. Phenolic antioxidants such as Irganox® 1010 from BASF are given in Plastics Additive Handbook, 5th edition, H. Zweifel, ed., Hanser Publishers, Munich, 2001, pages 98-107, page 116 and page 121. Preference is given to phenolic antioxidants whose number average molecular weight is between $0.6 \times 10^3$ g/mol and $2 \times 10^3$ g/mol.

An example of the phenolic antioxidant which is preferably used is 1:1 mixture of pentaerythrityl tetrakis(3-(3,5-bis(1,1-dimethylethyl)-4-hydroxyphenyl) propionate) and 3,3'-bis(3,5-di-tert-butyl-4-hydroxyphenyl)-n,n'-hexamethylenedipropionamide (Irganox® 1125, from BASF).

The phenolic antioxidants are preferably used in concentrations of from 0.1% to 5% by weight, preferably from 0.1% to 2% by weight, in particular from 0.5% to 1.5% by weight, based on the total weight of TPU.

The TPU which are exposed to UV light are preferably additionally stabilized with a UV absorber. UV absorbers are generally known as molecules which absorb high-energy UV light and dissipate energy. Customary UV absorbers which are employed in industry belong, for example, to the group of cinnamic esters, diphenylcyan acrylates, formamidines, benzylidene malonates, diarylbutadienes, triazines and benzotriazoles. Examples of commercial UV absorbers may be found in Plastics Additive Handbook, 5th edition, H. Zweifel, ed, Hanser Publishers, Munich, 2001, pages 116-122.

In a preferred embodiment, the UV absorbers have a number average molecular weight of greater than $0.3\times10^3$ g/mol, in particular greater than $0.39\times10^3$ g/mol. Furthermore, the UV absorbers which are preferably used have a molecular weight of not more than $5\times10^3$ g/mol, particularly preferably not more than $2\times10^3$ g/mol.

Particularly useful UV absorbers are benzotriazoles. Examples of particularly suitable benzotriazoles are Tinuvin® 213, Tinuvin® 328, Tinuvin®571 and Tinuvin® 384 from BASF SE and also Eversorb®82 from Everlight Chemical. The UV absorbers preferably are added in amounts of from 0.01 5% by weight to 5% by weight, based on the total weight of the TPU, preferably 0.15% by weight to 2.0% by weight, in particular 0.25% by weight to 0.5% by weight, based on the total weight of TPU.

The above-described UV stabilizers based on an antioxidant and UV absorbers sometimes are not sufficient to ensure good stability of TPU against damaging influence of UV rays in some applications. In this case, a hindered amine light stabilizer (HALS) can be added in addition to antioxidant and UV absorber to TPU. The activity of HALS compounds is based on their ability to form nitroxyl radicals which intervene in mechanism of oxidation of polymers. HALSs are highly efficient UV stabilizers for most polymers.

HALS compounds are generally known and are commercially available. Examples of commercially available HALS may be found in Plastics Additive Handbook, 5th edition, H. Zweifel, Hanser Publishers, Munich, 2001, pages 123-136. As "hindered amine light stabilizers", preference is given to hindered amine light stabilizers having a number average molecular weight of greater than 0.5 kg/mol. Furthermore, the molecular weight of preferred HALS compounds should be not more than 10 kg/mol, particularly preferably not more than 5 kg/mol.

Particularly preferred "hindered amine light stabilizers" are bis(1,2,2,6,6-pentamethylpiperidyl) sebacate (Tinuvin® 765, BASF SE) and the condensation product of 1-hydroxyethyl-2,2,6,6-tetramethyl-4-hydroxypiperidine and succinic acid (Tinuvin® 622). Very particular preference is the condensation product of 1-hydroxyethyl-2,2,6,6-tetramethyl-4-hydroxypiperidine and succinic acid (Tinuvin® 622), when the titanium content of the product is <150 ppm, preferably <50 ppm, in particular <10 ppm. HALS compounds are preferably used in a concentration of from 0.01 to 5% by weight, particularly preferably from 0.1 to 1% by weight, in particular from 0.15 to 0.3% by weight, based on the total weight of TPU.

A particularly preferred UV stabilizer comprises a mixture of a phenolic stabilizer, a benzotriazole and an HALS compound in the above-described preferred amounts.

Further details regarding the abovementioned auxiliaries and additives may be found in the specialist literature, e.g. in Plastics Additive Handbook, 5th edition, H. Zweifel, ed, Hanser Publishers, Munich, 2001.

Besides the stated components a), b), and c) and, if appropriate, d) and e) it is also possible to use chain regulators, usually having a number average molecular weight of 31 g/mol to 3 kg/mol. These chain regulators are compounds which have only one isocyanate-reactive functional group, such as monofunctional alcohols, monofunctional amines and/or monofunctional polyols, for example. Chain regulators of this kind allow a precise rheology to be set, particularly in the case of TPUs. Chain regulators can be used generally in an amount of 0 to 5, preferably 0.1 to 1, part(s) by weight, based on 100 parts by weight of component b), and in terms of definition are included in component (c).

To adjust the hardness of the TPU, component (b) which is reactive toward isocyanates and chain extenders (c) can be varied within a relatively wide range of molar ratios. Molar ratios of component (b) to the total of chain extenders (c) to be used from 10:1 to 1:10, in particular from 1:1 to 1:4, have been found to be useful, with hardness of the TPU increasing with increasing content of (c).

Thermoplastic polyurethanes used as basis for the final products also referred to as thermoplastic polyurethane composition also referred to as crosslinked polyurethanes preferably have a Shore A hardness of generally less than 98 Shore A in accordance with DIN 53505, more preferred from 45 Shore A to 95 Shore A, even more preferred from 60 Shore A to 90 Shore A, and most preferred from 75 Shore A to 90 Shore A.

Preferably, the thermoplastic polyurethane composition of the present invention has a density in a range from 1.0 g/cm$^3$ to 1.3 g/cm$^3$. The tensile strength of the TPU composition in accordance with DIN 53504 is more than 10 MPa, preferably more than 15 MPa, particularly preferably more than 20 MPa. The TPU composition of the invention has an abrasion loss in accordance with DIN 53516 of generally less than 150 mm$^3$, preferably less than 100 mm$^3$.

In general, thermoplastic polyurethanes are prepared by reacting (a) isocyanates with (b) compounds reactive toward isocyanates, usually having a number average molecular weight (Mn) of from 0.5 kg/mol to 10 kg/mol, preferably from 0.5 kg/mol to 5 kg/mol, particularly preferably from 0.8 kg/mol to 3 kg/mol, and (c) chain extenders having a number average molecular weight (Mn) of from 0.05 kg/mol to 0.499 kg/mol, if appropriate in the presence of (d) catalysts and/or (e) conventional additives.

The thermoplastic polyurethane may be produced by two different kinds of processes, namely "one-step" processes and "two-step" process.

In a one-step process the raw material of thermoplastic polyurethane composition are mixed together by known processes in the art either continuously or batch-wise. The one-step process for preparing the TPU composition of the invention comprises reacting component (a) with component (b) and component (c) and optionally component (d) and/or optionally component (e) and/or optionally component (f). Preferably the reaction is carried out at a temperature in range from 70° C. to 280° C., more preferably from 80° C. to 250° C., and even more preferably from 80° C. to 220° C.

In the two-step process the thermoplastic polyurethane composition is produced by firstly producing NCO prepolymers, based on (a) isocyanates and (b) one or more compounds reactive toward isocyanate, which is preferably (c) one or more chain extender having a molecular weight of from 60 g/mol to 499 g/mol. NCO prepolymers refers to intermediates of the isocyanate polyaddition reaction with a surplus of NCO groups. These prepolymers have preferably a NCO content of from 8% to 27% by weight based on the weight of the prepolymer. In the second step the NCO prepolymers will then react with (b) one or more compounds reactive toward isocyanate also referred to as polyol, if appropriate in the presence of (d) catalysts and/or (e) conventional additives.

The thermoplastic polyurethane produced in a way as outlines above is thermoplastic, which means that the molecules practically are not crosslinked. Therefore the thermoplastic polyurethane is meltable. This thermoplastic polyurethane is normally produced in form of granules, pellets or the like. Heating this thermoplastic polyurethane and forming it will derive in the final product.

The reaction preparing the TPU composition of the invention can be carried out at customary indexes, preferably at an index of from 0.6 to 1.2, more preferably at an index of from 0.8 to 1.1. The index is defined by the molar ratio of the total isocyanate groups of the component (a) used in the reaction to the groups which are reactive toward isocyanates, i.e. the active hydrogens, of components (b) and (c). At an index of 1.0, there is one active hydrogen atom, i.e. one function which is reactive toward isocyanates, of components (b) and (c) per isocyanate group of component (a). At indexes above 1.0, more isocyanate groups than OH groups are present.

Isocyanate Prepolymer

For the purpose of the present invention, isocyanate prepolymer refers to the reaction product of (a) isocyanates with (b) compounds which are reactive toward isocyanates and have a number average molecular weight in the range from 0.5 kg/mol to 10 kg/mol, preferably from 1 kg/mol to 5 kg/mol. Isocyanate prepolymers are intermediates of the isocyanate polyaddition reaction. In a preferred embodiment the prepolymer has a glass transition temperature Tg below −15° C. and a melting temperature below 70° C. measured by means of DSC in accordance with DIN EN ISO 11357-1.

Suitable prepolymers may have preferably a NCO content of from 4 to 27 parts by weight based on the weight of the prepolymer. Suitable prepolymer according to the invention may be used in the form of a single prepolymer or a mixture of prepolymers. In one embodiment of the invention mixtures of prepolymers are used.

Most preferred isocyanate prepolymer is the reaction product between diphenylmethane 4,4'-diisocyanate, and/or diphenylmethane 2,2'-diisocyanate, and/or diphenylmethane 2,4'-diisocyanate (MDI) and a polyester polyol based on adipic acid, 2-methyl-1,3-propanediol and trimethylolpropane, wherein the mole ratio of said polyester polyols to said diisocyanates is 1:1 to 1:5, preferably 1:1.2 to 1:3, more preferably 1:1.5 to 1:2.5, such as 1:2.

In a preferred embodiment, the ratio of 2-methyl-1,3-propanediol and trimethylolpropane should make the polyester polyol have an average functionality >2, preferably between 2.1 and 3, more preferably between 2.1 and 2.7, most preferably between 2.2 and 2.5.

In the present invention, the isocyanate prepolymer has an average isocyanate functionality (Fn) of more than 2, preferably between 2.1 and 3, more preferably between 2.1 and 2.7, more preferably between 2.2 and 2.5, and most preferably between 2.3 and 2.5. In a preferred embodiment, in order to achieve such isocyanate functionality, where the Mn of the polyester polyols is 1 kg/mol, the mole ratio of 2-methyl-1,3-propanediol/trimethylolpropane may range from 53.5/1 to 4.5/1 (Fn=2.1 to 3), 53.5/1 to 6.8/1 (Fn=2.1 to 2.7) or 26.3/1 to 9.9/1 (Fn=2.2 to 2.5).

Plasticizer

Plasticizers work by being embedded between the chains of polymers, spacing them apart (increasing the "free volume"), and thus significantly lowering the glass transition temperature of the plastic and making it softer. Plasticizer brings about improved flexibility and durability to the resulting crosslinked thermoplastic polyurethane.

Plasticizers used in this invention are $C_{3-15}$, preferably $C_{3-10}$, polycarboxylic acids and their esters with linear or branched $C_{2-30}$, aliphatic alcohols, benzoates, epoxidized vegetable oils, sulfonamides, organophosphates, glycols and its derivatives, and polyethers.

Preferred plasticizers are sebacic acid, sebacates, adipic acid, adipates, glutaric acid, glutarates, phthalic acid, phthalates (for example with C8 alcohols), azelaic acid, azelates, maleic acid, maleate, citric acid and its derivatives, see for example WO 2010/125009, incorporated herein by reference. The plasticizers may be used in combination or individually.

One specific class of preferred plasticizers is phthalate-based plasticizers, such as phthalate esters of C8 alcohols, which are advantageous for resistance to water and oils. Some preferred phthalate plasticizers are bis(2-ethylhexyl) phthalate (DEHP), preferably used in construction materials and medical devices, diisononyl phthalate (DINP), preferably used in garden hoses, shoes, toys, and building materials, di-n-butyl phthalate (DnBP, DBP), butyl benzyl phthalate (BBzP), preferably used for food conveyor belts, artificial leather, and foams, diisodecyl phthalate (DIDP), preferably used for insulation of wires and cables, car undercoating, shoes, carpets, pool liners, di-n-octyl phthalate (DOP or DnOP), preferably used in flooring materials, carpets, notebook covers, and high explosives, diisooctyl phthalate (DIOP), diethyl phthalate (DEP), and diisobutyl phthalate (DIBP), di-n-hexyl phthalate, preferably used in flooring materials, tool handles, and automobile parts.

Another preferred class of plasticizers are selected from the group of adipates, sebacates and maleates, such as bis(2-ethylhexyl) adipate (DEHA), dimethyl adipate (DMAD), monomethyl adipate (MMAD), dioctyl adipate (DOA), dibutyl sebacate (DBS), dibutyl maleate (DBM), and diisobutyl maleate (DIBM). Preferred are adipate-based plasticizers, preferably used for low-temperature application and high resistance to ultraviolet light.

Other preferred plasticizers are selected from the group of benzoates, epoxidized vegetable oils, sulfonamides, N-ethyl toluene sulfonamide (o/p ETSA), ortho and para isomers, N-(2-hydroxypropyl)benzene sulfonamide (HP BSA), N-(n-butyl)benzene sulfonamide (BBSA-NBBS), organophosphates, preferably selected from tricresyl phosphate (TCP), tributyl phosphate (TBP), glycols and its derivatives, polyethers, such as triethylene glycol dihexanoate (3G6, 3GH), tetraethylene glycol diheptanoate (4G7).

Another group of preferred plasticizers are biodegradable plasticizers, preferably selected from acetylated monoglycerides, preferably for the use as food additives, alkyl citrates, also preferably used in food packaging, medical products, cosmetics and children toys, triethyl citrate (TEC), acetyl triethyl citrate (ATEC), tributyl citrate (TBC), acetyl tributyl citrate (ATBC), especially compatible with PVC and vinyl chloride copolymers, trioctyl citrate (TOC), preferably used for gums and controlled release medicines, acetyl trioctyl citrate (ATOC), preferably used for printing ink, trihexyl citrate (THC), preferably used for controlled release medicines, acetyl trihexyl citrate (ATHC), butyryl trihexyl citrate, also referred to as BTHC, trihexyl o-butyryl citrate, trimethyl citrate (TMC), alkyl sulphonic acid phenyl ester (ASE).

Further preferred groups of plasticizers used in combination with thermoplastic polyurethane and prepolymers according to the invention are selected from the group of phthalic esters, citric acid esters, adipic acid esters and cyclohexane dicarboxylic acid esters.

The most preferred group of plasticizers are cyclohexane dicarboxylic acid and its esters, further preferred are esters of 1,2-cyclohexane dicarboxylic acid, even further preferred are alkyl esters with each alkyl structure having between 3 and 30 carbon atoms, most preferred plasticizer in combination with a thermoplastic polyurethane and an isocyanate prepolymer according to this invention is 1,2-Cyclohexane dicarboxylic acid diisononyl ester (BASF trademark: DINCH®).

In one preferred embodiment, the plasticizer has a boiling point at $1.013 \times 10^5$ Pa of at least 10° C., more preferred 20° C., and most preferred at least 50° C., above the melting temperature of the thermoplastic polyurethane. The boiling point of the plasticizer is measured according to ASTM D1078-11 at vacuum pressure and corrected to the boiling point at $1.013 \times 10^5$ Pa by pressure nomograph. The term "melting point" in this specification means the maximum of the melting peak of a heating curve measured using a commercially available DSC device (e.g. DSC 7 from Perkin-Elmer) in accordance with DIN EN ISO 11357-1 at a heating rate 20° C./min. The vaporization temperature of the plasticizer is over 200° C., more preferred over 220° C., even more preferred over 250° C. and most preferred over 300° C. at $1.013 \times 10^5$ Pa according to ASTM D1078-11. The water content of the plasticizer is preferred below 0.1% by weight, more preferred below 0.05% by weight and most preferred below 0.02% by weight. The water content is determined according to ASTM E1064. The plasticizer has an acid number less than 0.1 mgKOH/g measured according to ASTM D-1045.

In a preferred embodiment, the plasticizer is mixed with the starting materials of the isocyanate prepolymer, so that it is included in the latter.

In one preferred embodiment the prepolymer composition according to the invention comprises 1% by weight to 50% by weight of the plasticizer as outlined above, more preferred, 2% by weight to 20% by weight and even more preferred 4% by weight to 10% by weight, and most preferred about 5% by weight, further preferred the plasticizer is 1,2-Cyclohexane dicarboxylic acid diisononyl ester (BASF trademark: DINCH®).

PMDI

PMDI, which has been known as an important isocyanate to produce polyurethane, is a polymethylene polyphenyl polyisocyanate as shown below, more preferably PMDI is a mixture of compounds having a formula as shown below:

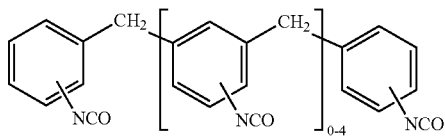

PMDI suitable for the invention may be in a form of homopolymer, copolymer or the mixture thereof. With no limitation, suitable PMDI according to the invention would have a functionality of about 2 to 6, preferably about 2 to 4, more preferably about 2.5 to 3. Examples of PMDI for using in the present invention include, but not limited to those commercially available from BASF SE under the trademark Lupranate®, such as Lupranate® M20S and M20R.

In one preferred embodiment, the isocyanate prepolymer composition comprises 1% by weight to 56% by weight of PMDI, more preferred, 10% by weight to 50% by weight and even more preferred 25% by weight to 50% by weight.

Supplementary Substance

For the purpose of the present invention, supplementary substance refers to any substance that will be added to the reaction system of said thermoplastic polyurethane, said isocyanate prepolymer and said plasticizer, but not include the said thermoplastic polyurethane, said isocyanate prepolymer and said plasticizer. Usually such substances include the auxiliaries and additives commonly used in this art, as shown in the above under the subtitle "thermoplastic polyurethane".

Processing steps in the preparation of the crosslinked thermoplastic polyurethane The crosslinked thermoplastic polyurethane is prepared by reacting the following components:
a thermoplastic polyurethane; and
the isocyanate prepolymer composition according to the invention.

In a specific embodiment, the process for preparing a crosslinked thermoplastic polyurethane of the invention comprises reacting the following components:
a thermoplastic polyurethane;
the isocyanate prepolymer composition according to the invention; and
a supplementary substance.

In a preferred embodiment, the crosslinked thermoplastic polyurethane is formed from
1) a thermoplastic polyurethane based on:
diphenylmethane 4,4'-diisocyanate (4,4'-MDI),
1,4-butanediol (as chain extender), and
a mixture of at least one polyester polyol and at least one polyether polyol, preferably comprising a polyester polyol based on adipic acid and ethylene glycol, and/or 1,4'-butanediol, and/or 2-methyl-1,3-propanediol; even more preferably, the polyester polyol comprises 2-methyl-1,3-propanediol and 1,4-butanediol and a polyether polyol comprises polytetrahydrofuran (PTHF), wherein the polyester polyol is used in amount of more than 40% by weight, preferably more than 60% by weight, more preferably more than 80% by weight, and most preferably more than 90% by weight, based on the total weight of the polyol mixture; and
2) an isocyanate prepolymer composition, comprising:
an isocyanate prepolymer made from diphenylmethane 4,4'-diisocyanate (4,4'-MDI) and a polyol, more preferred a polyester polyol, even more preferably a polyester polyol based on adipic acid, 2-methyl-1,3-propanediol and trimethylolpropane;
PMDI, e.g. Lupranate® M20S or M20R commercially available from BASF SE; and optionally, a plasticizer, preferably 1,2-cyclohexane dicarboxylic acid diisononyl ester (BASF trademark: DINCH®).

In the present invention, the isocyanate prepolymer composition preferably has an isocyanate functionality of more than 2, preferably in the range from 2.1 to 3, more preferably between 2.1 and 2.7, most preferably between 2.2 and 2.5.

In another preferred embodiment the reaction product of the thermoplastic polyurethane and the isocyanate prepolymer composition has a kofler melting temperature at $1.013 \times 10^5$ Pa more than 180° C., more preferably more than 220° C. and most preferably more than 250° C. The kofler melting temperature refers to the temperature at which the reaction product changes from solid to liquid after it was placed on the hot metal strip of the kofler bench for 1 min.

In a specific embodiment, if the plasticizer is present in said composition, the isocyanate prepolymer is first mixed with the plasticizer, and then with PMDI to form a mixture, and then the mixture is further mixed with the molten thermoplastic polyurethane, and the optional supplementary substance.

In a further specific embodiment, the process is carried out in a moulding apparatus; thus, the reaction between the components and molding proceed simultaneously. In such an embodiment, the final product is a molded crosslinked thermoplastic polyurethane product, such as film, fiber, coating, damping element, seal, bellow, flooring for building or transportation, cable, cable plug, cable sheathing, laminate, profile, belt, roller, hose, towing cable, shoe sole, solar module, plug connections, trim in automobiles or wiper blades, with preference given to automobile parts, fibers, films, cables, hoses or shoes, especially melt-spun elastic fiber.

In addition, a chemical and/or physical blowing agent or a gas can be introduced into the thermoplastic polyurethane composition of the invention. Foamed products are produced in this way.

In the case of a product of melt-spun elastic fiber, the process may include the following steps: (1) melting a thermoplastic polyurethane in a extruder at a temperature of 180° C. to 220° C.;

(2) to the molten thermoplastic polyurethane, adding the isocyanate prepolymer composition according to the invention and mixing the resulting mixture to form a melt;

(3) extruding the melt with a spinneret heated at 190° C. to 230° C. to obtain a melt-spun elastic fiber. Optionally, the process further includes the following subsequent steps:

(4) spraying finish oil on the fiber, and the finish oil can be mineral oil and/or silicone oil;

(5) winding up the fiber through a roller at a line speed of 100 to 1000 m/min;

(6) storing the fibers for at least 15 h at 80° C.

In such a process, the isocyanate prepolymer composition according to the invention is heated and used at temperature above 20° C. to have better flowability, the temperature of the isocyanate prepolymer composition according to the invention should be lower than 80° C. to avoid undesired reactions, e.g. allophante cross linking. So the limiting factor is the high viscosity of the isocyanate prepolymer. Now it was surprisingly found that by combining PMDI and optionally a plasticizer with the isocyanate prepolymer to form a composition as described above, the viscosity of the isocyanate prepolymer compositions can be substantially reduced, and thus reaction products of thermoplastic polyurethane and isocyanate prepolymer compositions with improved mechanical properties and higher temperature resistance are obtainable even with equipment not being designed for very high pressure application.

In one embodiment, the PMDI and/or plasticizer is added to the thermoplastic polyurethane, the isocyanate prepolymer and/or a mixture of the isocyanate prepolymer and the thermoplastic polyurethane.

In one embodiment, the thermoplastic polyurethane and/or the isocyanate prepolymer is mixed with the PMDI and/or plasticizer.

More preferred the PMDI and/or plasticizer is added to the isocyanate prepolymers.

Preferably, the plasticizer is 1,2-cyclohexane dicarboxylic acid diisononyl ester (BASF trademark: DINCH®), PMDI has chemical structure as shown below:

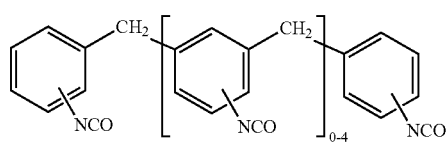

PMDI suitable for the invention may be in a form of homopolymer, copolymer or the mixture thereof. With no limitation, suitable PMDI according to the invention would have a functionality of about 2 to 6, preferably about 2 to 4, more preferably about 2.5 to 3. Examples of PMDI for using in the present invention include, but not limited to those commercially available from BASF SE under the trademark Lupranate®, such as Lupranate® M20S and M20R.

Preferably the mixture comprising the prepolymer composition has a viscosity of less than 8 Pa*s, more preferably less than 6 Pa*s, most preferred less than 5 Pa*s which is measured by a commercial available rheometer (e.g. HAAKE Rheostress 1) at 75° C.

For producing the reaction product, the thermoplastic polyurethane is preferably preheated to temperature from 80° C. to 110° C. and kept at this temperature for a period of time, for example 3 hours to dry the thermoplastic polyurethane. Then the thermoplastic polyurethane is put into an injection moulding machine or extruder to melt the thermoplastic polyurethane. The temperatures is preferably set from 160° C. to 280° C., more preferably from 180° C. to 250° C., and even more preferably from 180° C. to 220°. The isocyanate prepolymers is preferably preheated to temperature from 40° C. to 90° C., more preferred to 50° C. to 80° C., and then is added to the injection moulding machine or extruder to be mixed with the molten thermoplastic polyurethane. It should be appreciated that the PMDI and/or plasticizer is introduced in any way described in the above.

The following examples are intended to illustrate the invention without limiting.

EXAMPLE 1

Preparation a polyester polyol with average functionality 2.2 and number average molecular weight of 1 kg/mol.

657.8 g (4.51 mol) adipic acid, 477.5 g (5.31 mol) 2-methyl-1,3-propanediol and 26.8 g (0.2 mol)trimethylolpropane were stirred at 225° C.-230° C. in a 2 liter three-necked flask equipped with a mechanical stirrer, thermometer, and a distillation head. After the rate of distillation significantly decreased and the mixture became clear, the distillation was continued under reduced pressure (33 kPa) until an acid number less than 0.3 mg KOH/g detected in accordance with ASTM D-1045 was obtained.

The following examples 2-8 are for preparing isocyanate prepolymers and the compositions thereof.

EXAMPLE 2 (COMPARATIVE EXAMPLE)

2000 g polyester diol having a number average molecular mass of 2 kg/mol, obtained from adipic acid, 2-methyl-1,3-propanediol and 1,4-butanediol, with the latter two in the mass ratio of 1:1 (commercially available from BASF as Lupraphen® 6610/1), was added to 500 g diphenylmethane-4,4'-diisocyanate with mechanical stirring and the reaction mixture temperature was controlled between 50° C.-65° C. After all the polyester diol was added, the reaction mixture was reacted at 70° C. for additional 3 hours.

EXAMPLE 3 (COMPARATIVE EXAMPLE)

12.1 g trimethylolpropane was mixed with 735.5 g Lupraphen® 6610/1, then this mixture was added to 252.4 g diphenylmethane-4,4'-diisocyanate with mechanical stirring and the reaction mixture temperature was controlled between 50° C. and 65° C. After adding all the polyol, the reaction mixture temperature was kept at 70° C. for additional 3 hours.

EXAMPLE 4 (COMPARATIVE EXAMPLE)

600 g polyol made according to example 1 was added to 346 g diphenylmethane-4,4'-diisocyanate with mechanical stirring and the reaction mixture temperature was controlled between 50° C. and 65° C. After adding all the polyol, the reaction mixture temperature was kept at 70° C. for additional 3 hours.

EXAMPLE 5 (INVENTIVE EXAMPLE)

519 g diphenylmethane-4,4'-diisocyanate and 157.7 g 1,2-cyclohexane dicarboxylic acid diisononyl ester were mixed, to this mixture 905.9 g polyol made according to example 1 was added under mechanical stirring. The reaction mixture temperature was controlled between 50° C. and 65° C. After adding all the polyol, the reaction mixture temperature was kept at 70° C. for additional 3 hours.

EXAMPLE 6 (INVENTIVE EXAMPLE)

500 g isocyanate prepolymer composition made according to example 5 was mixed with 167 g PMDI (BASF, Lupranate® M20S) at 60° C.

EXAMPLE 7 (INVENTIVE EXAMPLE)

500 g isocyanate prepolymer composition made according to example 5 was mixed with 250 g polymethylene polyphenyl polyisocyanate (BASF, Lupranate® M20S) at 60° C.

EXAMPLE 8 (INVENTIVE EXAMPLE)

500 g isocyanate prepolymer composition made according to example 5 was mixed with 500 g polymethylene polyphenyl polyisocyanate with a functionality about 2.7 (BASF Lupranate® M20S) at 60° C.

TABLE 1 viscosity of isocyanate prepolymers/prepolymer compositions

| | Examples | | | | | | |
|---|---|---|---|---|---|---|---|
| | 2(C) | 3(C) | 4(C) | 5 | 6 | 7 | 8 |
| Viscosity (Pa*s at 75° C.) | 5.0 | 8.5 | 9.0 | 5.5 | 2.0 | 1.3 | 0.8 |

It is evident from table 1 that the plasticizer reduces the viscosity of the isocyanate prepolymer composition and the viscosity is further reduced by additional PMDI (BASF SE, Lupranate® M20S).

EXAMPLES 9-15

In these examples, melt-spun elastic fiber were produced by the following process:
(1) melting a thermoplastic polyurethane, e.g. BASF TPUs such as BASF Elastollan® 2280A10 which is made from 4,4'-MDI, 1,4-butanediol, polytetramethylene ether glycol with number molecular weight 1000 g/mol, and Lupraphen® 6610/1, in a single screw extruder at a temperature of 190° C. or as indicated;
(2) adding the prepolymer or prepolymer composition obtained from Examples 2-8 into the molten TPU from step (1), and mixing them to form a melt;
(3) extruding the melt through a spinneret which is heated at 200° C. or as indicated to obtain a melt-spun elastic fiber;
(4) spraying finish oil on the fiber, and the finish oils was silicone oil;
(5) winding up the fiber through a roller at a line speed of 500 m/min;
(6) storing the fibers for 15 h at 80° C. for better comparability.

EXAMPLE 9 (COMPARATIVE EXAMPLE)

880 g Elastollan® 2280A10 with 120 g isocyanate prepolymer from Example 2, with a spinneret temperature 200° C.

EXAMPLE 10 (INVENTIVE EXAMPLE)

880 g Elastollan® 2280A10 with 120 g isocyanate prepolymer from Example 3, with a spinneret temperature 210° C.

EXAMPLE 11 (INVENTIVE EXAMPLE)

880 g Elastollan® 2280A10 with 120 g isocyanate prepolymer from Example 4, with a spinneret temperature 209° C.

EXAMPLE 12 (INVENTIVE EXAMPLE)

870 g Elastollan® 2280A10 with 130 g isocyanate prepolymer from Example 5, with a spinneret temperature 205° C.

EXAMPLE 13 (INVENTIVE EXAMPLE)

940 g Elastollan® 2280A10 with 60 g isocyanate prepolymer composition from Example 6, with a spinneret temperature 198° C.

EXAMPLE 14 (INVENTIVE EXAMPLE)

940 g Elastollan® 2280A10 with 60 g isocyanate prepolymer composition from Example 7, with a spinneret temperature 201° C.

EXAMPLE 15 (INVENTIVE EXAMPLE)

940 g Elastollan® 2280A10 with 60 g isocyanate prepolymer composition from Example 8, with a spinneret temperature 204° C.

EXAMPLE 16 (COMPARATIVE EXAMPLE)

One 20D melt-spun elastic fiber commercially available from the market made by Jiangsu Nanhuanghai Industry commerce Co., Ltd.

TABLE 2 processing condistions and properties of the fiber products

| | Examples | | | | | | | |
|---|---|---|---|---|---|---|---|---|
| | 9(C)-2ᶜ | 10-3 | 11-4 | 12-5 | 13-6 | 14-7 | 15-8 | 16(C) |
| Spinneret temperature (° C.)ᵃ | 200 | 210 | 209 | 205 | 204 | 201 | 198 | N.A. |

TABLE 2-continued processing condistions and properties of the fiber products

| | Examples | | | | | | | |
|---|---|---|---|---|---|---|---|---|
| | 9(C)-2$^c$ | 10-3 | 11-4 | 12-5 | 13-6 | 14-7 | 15-8 | 16(C) |
| Kofler melt temperature (° C.)$^b$ | 198 | 220 | 220 | 215 | 230 | 240 | 250 | 200 |

$^a$the spinneret temperatures can be varied due to the design of melt spinning equipments.
$^b$the kofler melting temperature refer to the temperature that the fiber changes from solid to liquid after it was placed on the hot metal strip of the kofler bench for 1 min.
$^c$9-2 refers to example 9 with the isocyanate prepolymer from example 2.

From table 2, it is evident that the fibers with the isocyanate prepolymer compositions as required by the invention (Examples 10 to 15) show improved high temperature resistance than the fiber made from TPU and isocyanate prepolymer with functionality=2. The fibers disclosed also show improved high temperature resistance than the commercial available melt-spun elastic fiber.

The invention claimed is:

1. A crosslinked thermoplastic polyurethane composition, comprising a reaction product of the following components:
 a thermoplastic polyurethane;
 an isocyanate prepolymer composition; and optionally,
 a supplementary substance,
 wherein the isocyanate prepolymer composition comprises:
 an isocyanate prepolymer which is a reaction product of diphenylmethane diisocyanate and a polyester polyol consisting of a reaction product of adipic acid and 2-methyl-1,3-propanediol; and
 a polymethylene polyphenyl polyisocyanate (PMDI) with chemical structure shown below:

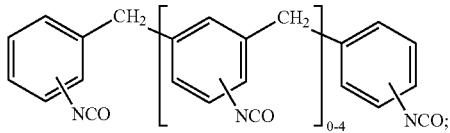

and optionally, a plasticizer, and
 wherein an average functionality obtained with the isocyanate prepolymer composition is between 2.1 and 3.

2. The crosslinked thermoplastic polyurethane composition of claim 1, which is in the form of a fiber.

3. The crosslinked thermoplastic polyurethane composition according to claim 1, wherein the PMDI has an average functionality of 2 to 6.

4. The crosslinked thermoplastic polyurethane composition of claim 1, wherein a mole ratio of the polyester polyol to the diphenylmethane 4,4'-diisocyanate is from 1/1.2 to 1/3.

5. A process for preparing the crosslinked thermoplastic polyurethane composition of claim 1, the process comprising reacting the following components:
 the thermoplastic polyurethane;
 the isocyanate prepolymer composition; and optionally,
 a supplementary substance.

6. The process of claim 5, wherein the PMDI, the plasticizer, or both, is added to the thermoplastic polyurethane, the isocyanate prepolymer and/or a mixture of the isocyanate prepolymer and the thermoplastic polyurethane.

7. The process of claim 5, wherein the PMDI, the plasticizer, or both, is mixed with starting materials of the isocyanate prepolymer, or if the plasticizer is present in said composition, the isocyanate prepolymer is first mixed with the plasticizer, and then with the PMDI.

8. A process for preparing the crosslinked thermoplastic polyurethane composition of claim 1, the process comprising:
 (1) melting the thermoplastic polyurethane in a extruder at a temperature of 180° C. to 220° C.;
 (2) adding the isocyanate prepolymer composition according to claim 1 to a molten thermoplastic polyurethane from (1) and mixing a resulting mixture to form a melt; and
 (3) extruding the melt through a spinneret heated at 190° C. to 230° C. to obtain a melt-spun elastic fiber.

9. The process of claim 8, further comprising:
 (4) spraying finish oil on the fiber;
 (5) winding up a resulting fiber through a roller at a line speed of 100 to 1000 m/min; and
 (6) storing the fiber for at least 15 h at 80° C.

* * * * *